United States Patent [19]

Kaus et al.

[11] Patent Number: 4,618,661
[45] Date of Patent: Oct. 21, 1986

[54] SUPPORTED HIGH EFFICIENCY POLYOLEFIN CATALYST COMPONENT AND METHODS OF MAKING AND USING THE SAME

[75] Inventors: Malcolm J. Kaus, Humble, Tex.; Nemesio D. Miro, Bartlesville, Okla.

[73] Assignee: Phillips Petroleum Company, Bartlesville, Okla.

[21] Appl. No.: 754,311

[22] Filed: Jul. 12, 1985

Related U.S. Application Data

[60] Continuation-in-part of Ser. No. 543,166, Oct. 19, 1983, abandoned, and a continuation-in-part of Ser. No. 535,630, Sep. 26, 1983, abandoned, which is a division of Ser. No. 389,619, Jun. 18, 1982, Pat. No. 4,422,957, which is a division of Ser. No. 146,341, May 2, 1980, Pat. No. 4,347,158, said Ser. No. 543,166, is a division of Ser. No. 252,661, Apr. 22, 1981, Pat. No. 4,425,257, which is a continuation-in-part of Ser. No. 146,341.

[51] Int. Cl.$^4$ .................. C08F 4/62; C08F 4/64; C08F 4/68
[52] U.S. Cl. .................. 526/114; 526/125; 526/348.6; 526/352; 526/351
[58] Field of Search .............. 526/122, 125, 137, 139, 526/141, 142, 158, 351, 114

[56] References Cited

U.S. PATENT DOCUMENTS

| 4,076,924 | 2/1978 | Toyota et al. | 526/125 |
| 4,253,984 | 3/1981 | Imai et al. | 526/125 X |
| 4,265,785 | 5/1981 | Giannini et al. | 526/125 X |
| 4,282,114 | 8/1981 | Ito et al. | 526/125 X |
| 4,356,295 | 10/1982 | Fujii et al. | 526/125 |

FOREIGN PATENT DOCUMENTS

| 2360609 | 3/1978 | France . |
| 1496440 | 12/1977 | United Kingdom . |
| 1550708 | 8/1979 | United Kingdom . |
| 2023155A | 12/1979 | United Kingdom . |
| 2015545A | 12/1979 | United Kingdom . |
| 2029424A | 3/1980 | United Kingdom . |
| 2028843A | 3/1980 | United Kingdom . |
| 2037300A | 7/1980 | United Kingdom . |
| 2042566A | 9/1980 | United Kingdom . |
| 1575856 | 10/1980 | United Kingdom . |
| 2047718A | 12/1980 | United Kingdom . |
| 2075033A | 11/1981 | United Kingdom . |

*Primary Examiner*—Patrick P. Garvin
*Attorney, Agent, or Firm*—Edward L. Bowman

[57] ABSTRACT

A supported high efficiency catalyst component for polyolefin production and methods of making and using the same are disclosed. A catalyst support made from a solid, particulate support material, a second solid material preferably substantially isostructural therewith and an organic electron donor compound is combined with a polymerization-active transition metal compound and optionally a second organic electron donor compound to form the catalyst component. Additionally, a dehydrating agent may be reacted with water in the solid, particulate support material in the production of the catalyst support. The methods of producing such a catalyst support and catalyst component are preferably performed by severe milling in the absence of any solvent. Such a catalyst produces polymer of such high quality and quantity that polymer extraction and polymer deashing are not necessary.

28 Claims, No Drawings

SUPPORTED HIGH EFFICIENCY POLYOLEFIN CATALYST COMPONENT AND METHODS OF MAKING AND USING THE SAME

This is a continuation-in-part of copending application Ser. No. 543,166, filed Oct. 19, 1983 and now abandoned, which in turn was a divisional of application Ser. No. 252,661 filed Apr. 22,1981 and now U.S. Pat. No. 4,425,257, the disclosure of which is incorporated herein by reference. Application Ser. No. 252,661 issued Jan. 10, 1984 as U.S. Pat. No. 4,425,257 and was a continuation-in-part of application Ser. No. 146,341, filed May 2, 1980 and now U.S. Pat. No. 4,347,158, the disclosure is also incorporated herein by reference.

This application is also a continuation-in-part of copending application Ser. No. 535,630 filed Sept. 26, 1983 and now abandoned, which was a divisional of application Ser. No. 389,619, filed on June 18, 1982, now U.S. Pat. No. 4,422,957. Application Ser. No. 389,619 was in turn a divisional of application Ser. No. 146,341, filed May 2, 1980, which is now U.S. Pat. No. 4,347,158.

BACKGROUND OF THE INVENTION

The invention relates to a supported high efficiency catalyst for production of polyolefins and to the production of an improved support for these catalysts.

Organometallic compounds have been used in combination with transition metal compounds to catalyze the production of high molecular weight polymers from ethylene and alpha-olefins to produce polymers having high stereoregularity.

The basic catalysts used in these methods are formed by combining a transition metal salt with a metal alkyl or hydride. Titanium trichloride and an aluminum alkyl, such as triethyl aluminum or diethyl aluminum chloride, are often used. However, such catalysts generally have low productivity and produce polymer with low stereoregularity.

Isotactic polypropylene results from a head-to-tail linkage of the monomer units resulting in the asymmetric carbon atoms all having the same configuration. The isotactic index is one measure of the percentage of isotactic isomer in the polymer formed. Atactic polypropylene results from random linkage of the monomer units. Isotactic polypropylene is a highly useful commercial product having high tensile strength, hardness, stiffness, resilience, clarity and better surface luster. Polypropylene finds extensive commercial use in injection molding, film, sheeting, filament and fiber applications. Commercially useful polypropylene contains essentially the stereoregular or isotactic isomer.

For most applications, the polymer produced using these basic catalysts must be extracted to remove the atactic (non-stereoregular) polymer to increase the percentage of isotactic (stereoregular) polymer in the final product. It is also necessary to deash polymer produced by this method to remove excess catalyst. The additional production steps of polymer extraction and polymer deashing add significantly to the cost of polymer produced with these basic catalysts.

The first improvement in these catalysts resulted from the use of mixed titanium trichloride and aluminum trichloride as the catalyst with an aluminum alkyl co-catalyst.

Later improvements centered on the supported catalysts. Many early supported catalysts were based on the reaction products of surface hydroxyl containing compounds with transition metal compounds. Examples include the reaction product of a transition metal compound with an hydroxy chloride of a bivalent metal, e.g., Mg(OH)Cl (British Patent No. 1,024,336), with Mg(OH)$_2$ (Belgian Patent Nos. 726,832; 728,002; and No. 735,291), and with SiO$_2$, Al$_2$O$_3$, ZrO$_2$, TiO$_2$, and MgO (British Patent Nos. 969,761; 969,767; 916,132; and 1,038,882).

Some later supported catalysts were based on the reaction products of magnesium alkoxides with transition metal compounds. Examples include the reaction product of a transition metal compound with Mg(OR)$_2$ (U.S. Pat. No. 3,644,318 and Belgian Patent Nos. 737,778; 743,325; and 780,530.)

Other supported catalysts were based on the reaction products of magnesium chloride with transition metal compounds. Titanium compounds were reacted with MgCl$_2$ (U.S. Pat. No. 3,642,746 and Belgian Patent Nos. 755,185; 744,221; and 747,846.)

Promoted catalysts result from the addition of certain Lewis bases (electron donors) to the catalyst system. The electron donor has in certain situations been combined with titanium trichloride during production of the catalyst. Electron donors have included the ethers, esters, amines, ketones and nitroaromatics. Although the promoted catalysts improved the isotactic index of the polymer, they generally still did not produce polymer of such quality and quantity as to permit the elimination of polymer extraction and polymer deashing to remove catalyst residue.

Recently, a catalyst component with sufficiently high yield to apparently eliminate the necessity for performing polymer deashing and polymer extraction was described in U.S. Pat. No. 4,149,990. However, this catalyst was produced in solution, requiring catalyst washing.

SUMMARY OF THE INVENTION

The catalyst component of the present invention overcomes many of the disadvantages of the above discussed prior art catalysts. Not only does the catalyst component of the present invention overcome those disadvantages associated with the polymerization of alpha-olefins to produce satisfactory industrial polymers, but also a polymer with superior characteristics is produced. Further, the catalyst component of the present invention exhibits superior characteristics and is produced by a method not only offering significant economic advantages, but also reducing energy consumption and pollution, over the prior art.

The present invention provides a supported high efficiency catalyst component for use in the polymerization of olefins, particularly alpha-olefins. Although the catalyst component has only been used in the homo-production of propylene, ethylene and 1-butene, it is believed that the catalyst will also produce satisfactory homopolymers or co-polymers from other alpha-olefins and low molecular weight dienes.

The catalyst component of the present invention is produced by interspersing a solid, particulate catalyst support material with a second solid material, preferably substantially isostructural with the particulate material. A titanium-free, solid, particulate catalyst support is produced by reacting at least a portion of a first organic electron donor compound with the second solid material at least on the surface of the support, to reduce the surface area thereof. A polymerization-active, transition metal compound, preferably a liquid titanium compound, is bound at least on the surface of the support to produce a solid, titanium-containing catalyst component. A second organic electron donor compound is optionally contacted with the support either before or simultaneously with the transition metal. All contacting of materials is preferably performed in the absence of a solvent or excess liquid reactant and in a vibratory or ball mill. An improved, highly efficient catalystcomponent having a low specific surface area, less than $1 m^2/g$ is produced.

DETAILED DESCRIPTION OF THE INVENTION

In order to obtain the high productivity and stereoregularity necessary for the formation of polymer with sufficiently high isotacticity and sufficiently low residue content to permit polymer use without polymer extraction or polymer deashing, it is presently believed that a supported catalyst component must be used.

It is believed that a solid, particulate support material which is substantially isostructural with titanium compounds, possibly permitting co-crystallization therewith, will provide the best support.

A solid, particulate support material selected from the group consisting of the Group IIA and IIIA salts and the salts of the multivalent metals of the first transition series with the exception of copper forms the nucleus of the improved support. The magnesium and manganese salts provide what is currently believed to be the most useful solid, particulate support materials. The magnesium and manganese dihalides, alkyloxides, aryloxides and combinations thereof have been suggested in the art to be satisfactory. Preferred support bases are $M(OR)_nX_{2-n}$ where M is magnesium or manganese, R is alkyl or aryl, X is a halide and n is 0, or 2. Examples include $MgCl_2$, $MgBr_2$, $MgI_2$, $MgF_2$, $Mg(OCH_3)_2$, $Mg(OCH_2CH_3)_2$, $Mg(OC_6H_5)_2$ and combinations thereof. In the preferred embodiment the magnesium dihalides, particular magnesium dichloride, form the solid, particulate support material.

Magnesium dichloride is especially preferred as the support material due to the high productivity of catalyst components using magnesium dichloride and the less noxious nature of its residue in the produced polymer.

Because the catalyst component is water and air reactive it is necessary to insure that the water content of the solid, particulate support material is sufficiently low so as not to interfere with the catalytic activity. For this reason, the magnesium dichloride used as the support material in the preferred embodiment should be anhydrous. Anhydrous magnesium dichloride is prepared by drying under an HCl blanket for 4 hours at a temperature of 350° C., or by any other conventional means.

In another feature of the present invention a dehydrating agent which reacts with the water present to produce a volatile reaction product under the reaction conditions and to produce a residue which is not detrimental to alpha-olefin polymerization is employed. Such dehydrating agents include the silicon tetrahalides, calcium carbide and calcium hydride. These agents may be reacted, preferably by co-comminution in a vibratory or ball mill, with a water containing solid, particulate support material prior to production of the catalyst component.

In the preferred embodiment, silicon tetrachloride has been used as an effective dehydrating agent for this purpose. Silicon tetrachloride effectively dehydrated water-containing magnesium dichloride support materials and surprisingly had no apparent effect on the activity of the resulting catalyst. It is preferred that only a quantity of dehydrating agent sufficient to react with the water present be used. The molar ratio of silicon tetrachloride to water present in the support material should be about 0.5 to one.

In another feature of this invention the catalyst support comprising a solid, particulate support material together with at least the reaction product of any water contained therein and a dehydrating agent, preferably silicon tetrachloride, may be used with any conventional means of supporting a polymerization-active transition metal compound thereon. Co-communication in the absence of any solvent is preferred. Alternative solvent methods suffer from the requirement of additional wash steps.

After this reaction, the resulting product may then be employed as the solid, particulate catalyst support material in the production of any catalyst component normally requiring anhydrous particulate supports, particularly anhydrous magnesium dichloride supports.

Another important feature of the present invention is the use of a second solid material, also preferably isostructural with octahedral titanium, in addition to the solid, particulate support material. This material is preferably different from but substantially isostructural with the solid, particulate support material. This second solid material is preferably selected from inorganic Lewis acids, especially the Group IIIA salts, particularly the halides, phosphorus trichloride or phosphorus oxytrichloride. In the preferred method of the present invention this second solid material is co-comminuted with the solid, particulate support material and optionally the dehydrating agent. The aluminum trihalides, particularly aluminum trichloride, are presently preferred as the second solid material. The preferred molar ratio of support material to second solid material, preferably magnesium dichloride to aluminum trichloride, is about eight to 0.5–3.0, more preferably eight to 0.75–1–1.5.

When starting with an anhydrous solid, particulate support material the support material and the second solid material, preferably magnesium dichloride and aluminum trichloride, are initially contacted, preferably co-comminuted in a vibratory or ball mill or other similar mixing device. At least an intimate admixture of the magnesium dichloride and the aluminum trichloride is formed and possibly a solid solution of formula $MgCl_2 \cdot (1/X) AlCl_3$ may be produced. The aluminum trichloride may be acting as an agglomerating agent as the specific surface area of the admixture or solid solution is rather low, generally about 4–6 $m^2/g$.

An additional feature of the present invention is the association of a first organic electron donor compound with this support to produce an improved support. It is believed that at least a portion of this first electron donor compound reacts with the second material to produce a reaction product at least on the surface of the support. Formation of this product results in decreased specific surface area of the support, possibly by blocking of the pores of the support. The resulting support generally has a specific surface area less than about 2 $m^2/g$. Preferably at least one moiety of this electron donor compound will produce a volatile reaction byproduct under the reaction conditions when the electron donor compound reacts with the second solid material. Such moiety will often be an alkyl group containing less than seven carbon atoms, preferably a methyl or ethyl group.

This electron donor compound may be chosen from organic compounds having at least one atom of oxygen, sulfur, nitrogen or phosphorus to function as the electron donor atom. Examples of such electron donors are ethers, esters, ketones, aldehydes, alcohols, carboxylic acids, phenols, thioethers, thioesters, thioketones, amines, amides, nitriles, isocyanates, phosphites and phosphines. The preferred electron donor compounds are the aromatic ethers and the esters, particularly the alkylaryl ethers and the alkyl esters of carboxylic acids. This superiority may be attributed to the presence of the pi electrons of the aromatic ring adjacent to the electron donor atoms. The preferred molar ratio of solid, particulate support material to first electron donor compound, in the preferred embodiment of magnesium dichloride to anisole, is about eight to 0.5–3.0, still more preferably about eight to 0.5–2.0, with about eight to 1–1.5 being especially preferred. The molar ratio of first electron donor compound to second solid material should be about one to one.

As presently understood, methyl phenyl ether is the most effective first electron donor. This superiority may be accounted for by the low steric hindrance of the methyl group as well as its inductive effect in addition to the previously discussed advantage of the aromatic ring. Further, a highly volatile methane derivation is formed on reaction of methyl phenyl ether with the second material. Although the exact reaction is not completely understood, it is believed that the ether linkage -O- associates with the aluminum of the support and at least a portion thereof reacts to produce a mixed phenoxide and a volatile methyl chloride. See co-pending U.S. Application Ser. No. 217,630, incorporated herein by reference. Although the complete reaction and structure of the support is not presently understood, it is believed possible that the reaction product of the methyl phenyl ether and aluminum trichloride may lower the specific surface area of the support by blocking the pores in the magnesium dichloride support.

The method of the present invention contemplates preferably the initial co-comminution of the above three components to produce an improved titanium-free, catalyst support. Although it is possible to mix all three components simultaneously, it has been found that better results are achieved by the initial interspersing of the solid, particulate support material and the second solid material, preferably magnesium dichloride and aluminum trichloride, followed by the later addition and reaction of the organic electron donor compound, preferably methyl phenyl ether. As stated above, a dehydrating agent, preferably silicon tetrachloride, may be pre-mixed with the solid, particulate support material to react with and remove any undesired water.

In addition to the improved, titanium-free catalyst support produced by the above method, the catalyst component of the present invention may contain a second organic electron donor compound. This electron donor compound may increase stereoregularity of the polymer by complexing or reacting with the particulate support and also associating with the active transition metal compound to produce a rigid template upon which the polymer may form. This electron donor compound may be chosen from the same group as that of the first electron donor, and may be the same or a different compound. However, it is believed for the same reasons given above that the alkyl aryl ethers and the alkyl esters of carboxylic acids, but particularly the aromatic esters, provide the best results. In particular, the most effective catalyst components have been produced by using ethyl benzoate as the second electron donor.

The preferred molar ratio of solid, particulate support material to second electron donor compound, in the preferred embodiment of magnesium dichloride to ethyl benzoate, is about eight to 0.5–3.0, or more preferably about eight to 0.5–1.5, still more preferably about eight to 0.8–1.2. The second electron donor compound should preferably be added in excess relative to the active transition metal compound. Most preferably, the molar ratio of second electron donor compound to active transition metal compound, in the preferred embodiment of ethyl benzoate to titanium tetrachloride, is about 1.6–2.4 to one. This second electron donor compound may be added to and mixed with the support prior to, during or after the addition of the active transition metal compound. In another embodiment this second electron donor compound may be precomplexed with the active transition metal compound prior to the addition of the resulting complex to the enhanced support.

The final constituent of the catalyst component of the present invention is an active tri, tetra- or penta-valent transition metal compound of the Group IVB–VIB metals, preferably of the formula $MO_p(OR)_m X_{n-2p-m}$. M is a Group IVB–VIB metal with valency n=3, 4 or 5. The metals titanium, vanadium, chromium and zirconium are preferred. Presently it appears that titanium is the most preferred metal due to its superior productivity. O is oxygen. p is 0 or 1. R is an alkyl, aryl, cycloalkyl group or substituted derivative thereof, where $0-\leq m \leq n$. X is any halide, i.e., chloride, bromide, iodide or flouride, although the chloride is preferred. The choice of a particular transition metal compound within the above formula will depend upon the reaction conditions and other constituents present in the catalyst. Some examples of active transition metal compounds which may be used are $TiCl_4$, $Ti(OCH_3)Cl_3$, $Ti(OCH_2CH_3)Cl_3$, $VC_3$, $VOCl_2$, $VOC_3$ and $VO(OCH_3)Cl_2$. The preferred active transition metal compound is liquid under the reaction conditions. The preferred active transition metal compound is a titanium tetrahalide, and particularly titanium tetrachloride. The preferred molar ratio of solid, particulate support material to active transition metal compound, in the preferred embodiment of magnesium dichloride to titanium tetrachloride, is about eight to 0.1–1.0, more preferably about 0.4–0.8, and still more preferably about eight to 0.4–0.6.

It is presently believed that the active transition metal, preferably tetravalent titanium, is not reduced to the trivalent state in the catalyst component. Rather, it is presently believed that this reduction takes place in situ after addition of the organometallic compound during polymerization.

The preferred method of the present invention provides for the addition of the second organic electron donor compound, preferably ethyl benzoate, to the solid, particulate catalyst support and preferably the co-comminution thereof in a vibratory or ball mill. This step is followed by the addition of the active metal compound, preferably titanium tetrachloride, to the resulting support and preferably further co-comminution. It is preferred to use an excess of the second organic electron donor compound, preferably ethyl benzoate, in relation to the active transition metal compound, preferably titanium tetrachloride. Although it is presently believed that this step-wise addition provides a superior catalyst, it is also contemplated that the active transition metal compound and the second electron donor may be preformed as a complex prior to addition of the complex to the catalyst support and co-comminution therewith.

The interspersing and mixing of the various constituents of the catalyst component as discussed above is preferably performed in the absence of any solvent. The final catalyst component contains substantially the same quantity of active transition metal, preferably titanium, as was contacted with the solid, particulate support during production of the catalyst component. This preparation in the absence of any solvent permits the resulting catalyst component to be used without extraction or washing and results in considerable savings in catalyst production costs.

The preferred method of producing the above catalyst component comprises the co-comminution of the constituents under an inert atmosphere in a vibratory or ball mill in the absence of any solvent. The solid, particulate support material is initially charged into the mill. If the solid, particulate support material contains water which must be removed, a sufficient quantity of dehydrating agent is initially added to the particulate support material and the resulting mixture co-comminuted at temperatures between about 0° C. and about 90° C. for from about 15 minutes to about 48 hours. Preferably this mixing is for from about 6 hours to about 24 hours, optimally for about 15 hours, at temperatures between about 35° C. and about 50° C.

Although co-comminution may take place at temperatures between about 0° C. and about 90° C. the preferred mixing temperature is from about 35° C. to about 50° C. Mixing times may range from about 15 minutes to about 48 hours. Preferred mixing times are from about 12 hours to about 20 hours, with optimal mixing at about 16 hours. Insufficient mixing will not yield a homogeneous compound, while overmixing may cause agglomeration or may significantly decrease particle size of the catalyst component, causing a direct reduction in particle size of the polypropylene produced from the catalyst component.

In an alternative embodiment a solid, particulate support material containing water, the dehydrating agent and the second solid material are charged into the ball or vibratory mill together and co-comminuted at temperatures between about 0° C. and about 90° C. for from about 15 minutes to about 48 hours. Preferably this mixing is for from about 12 hours to about 20 hours, optimally about 16 hours, at temperatures between about 35° C. and about 50° C.

A first electron donor compound is co-comminuted with the solid, particulate support material, second solid material and optional dehydrating agent to produce the catalyst support. Mixing may be at temperatures between about 0° C. and about 90° C. for from about 30 minutes to about 48 hours. The preferred mixing temperatures are from about 35° C. to about 50° C. for from about one hour to about 5 hours, although co-comminution for about 3 hours is optimal.

To the catalyst support produced as described above is added the active transition metal compound. Although many transition metal compounds of the formula $MO_p(OR)_mX_{n-2p-m}$ as described above will provide satisfactory catalyst components, liquid titanium tetrachloride is the preferred active compound. Such an active transition metal compound is added to the ball or vibratory mill and co-comminuted therein with the catalyst support. This mixing may be at temperatures from about 0° C. to about 90° C. and for from about 15 minutes to about 48 hours. It is preferred that this mixing take place at temperatures ranging from about 40° C. to about 80° C. and for from about 12 hours to about 20 hours, optimally for about 16 hours, to produce the supported high efficiency catalyst component.

In an alternative embodiment of the invention a second electron donor compound which may be different from or the same as the first electron donor compound may be co-comminuted with the catalyst support prior to addition of the active transition metal compound. In the preferred embodiment ethyl benzoate is co-comminuted in the ball or vibratory mill with the catalyst support at temperatures from about 0° C. to about 90° C. for from about 15 minutes to about 48 hours prior to addition of titanium tetrachloride. However, the preferred mixing is at from about 35° C. to about 50° C. for from about one hour to about 5 hours, optimally about 3 hours.

In another alternative embodiment of the invention, the second electron donor compound, e.g., ethyl benzoate, may be premixed with the active transition metal compound, e.g., titanium tetrachloride, prior to addition of the resulting complex to the catalyst support. This complex is then mixed with the catalyst support under the conditions and for the time specified above for the active transition metal compound.

The solid, titanium-containing catalyst component of the present invention, preferably obtained after co-comminution of the above ingredients, exhibits superior characteristics to previously known catalyst components. Such a catalyst component is a supported high efficiency catalyst component for the polymerization of alpha-olefins. The catalyst component of the present invention has a very low specific surface area, less than about $1 m^2/g$. Although the catalyst component of the present invention should, like those of the prior art, be handled in an inert atmosphere in the absence of water, the fact that this catalyst component is less reactive and produces less noxious decomposition products than the catalyst components of the prior art, produces a safer catalyst component.

The solid catalyst component powder produced by the above method may be stored with little or no long term loss of activity.

It is presently believed that the active transition metal, preferably tetravalent titanium, is not reduced to the trivalent state in the catalyst component. Rather, it is presently believed that this reduction takes place in situ after addition of the organometallic compound during polymerization.

The catalyst component produced by the foregoing methods is used in conjunction with a co-catalyst of an organometallic compound and optionally another organic electron donor compound to produce stereoregular polyolefins. The organometallic co-catalyst is selected from the group consisting of the alkyl aluminums, the alkyl aluminum halides and the alkyl aluminum hydrides. The preferred co-catalysts are the trialkyl aluminums, particularly triethyl aluminum and triisobutyl aluminum, with triethyl aluminum especially preferred. The molar ratio of organometallic co-catalyst to titanium containing catalyst component, preferably moles of triethyl aluminum to gram-atoms of Ti in the catalyst component of the present invention may range up to about 400 to one. The preferred molar ratio of organometallic co-catalyst to titanium containing catalyst component, preferably moles of triethyl aluminum to gram-atoms of Ti in the catalyst component of the present invention is about 50–300 to one, more preferably 150–300 to one, and most preferably about 240 to one. In continuous production processes a range of about 30 to 100 to one would be typical.

The organic electron donor compound is selected from the same group as the electron donor compounds of the titanium-containing catalyst component and may be the same or different therefrom. Preferred electron donor compounds are selected from the alkyl esters of the carboxylic acids such as ethyl anisate, methyl p-toluate or ethyl benzoate. The most preferred electron donor compound is methyl p-toluate. The preferred molar ratio of electron donor compound to titanium containing catalyst component, preferably moles of methyl p-toluate to gram-atoms of Ti in the catalyst component of the present invention is about 60–120 to one, most preferably about 70–96 to one. Expressed in other terms, the preferred molar ratio of organometallic co-catalyst to electron donor component, preferably moles of triethyl aluminum to moles of methyl p-toluate, is about 1.0–20.0 to one, more preferably about 2.0–3.5 to one.

A catalyst produced by the foregoing method may be used in standard methods for polymerization of alpha-olefins. The catalyst may be used in liquid pool, inert solvent or gas phase preparations. Essentially standard operating conditions may be used in these various polymerization methods. When so used, the catalyst of the present invention produces polypropylene having an isotactic index of at least 80, more preferably 90, and most preferably 93 or greater, a total ash content of not more than about 700 ppm, but more preferably as low as about 300 ppm, and a magnesium residue of less than about 20 ppm.

The preferred means of using the catalyst of the present invention is in liquid pool polymerization. When so used, in the preparation of polypropylene, the expensive steps of polymer extraction, polymer deashing and the associated solvent recovery are eliminated.

Most prior catalyst components have required an extraction step during the catalyst component manufacturing process. The catalyst component of the present invention, which may be produced in the absence of a solvent, eliminates such a step, and thereby drastically reduces not only the capital costs for catalyst component manufacturing plants, but also the operating manufacturing costs, while still producing a highly active catalyst component. Not only are these important economic advantages achieved, but also significant reductions in energy consumption and pollution are provided.

Another feature of the catalyst component support of the present invention provides other economic advantages. By using a dehydrating agent, the use of anhydrous magnesium chloride, more costly and more difficult to handle and process, is eliminated.

The catalyst component of the present invention may also be sized in accordance with various specifications, to achieve a polymer with fewer fine size particles, i.e. 200 mesh or less. This is important to reducing waste of polypropylene from loss of the fine powders and to decreasing handling problems associated with fine powders. Variations in the milling times in the production of the catalyst component of the present invention permit the ability of achieving desired coarseness of particles of the catalyst component and thus of the produced polymer.

The catalyst of the present invention provides high productivity, yielding as high as from about 8,000 to about 18,000 pounds of polymer per pound of catalyst or from about 400,000 to about 900,000 pounds of polymer per pound of titanium. This increased productivity thereby reduces catalyst utilization. It further reduces catalyst residues in the final polypropylene product, eliminating the need for polymer deashing. The high isotacticity of the produced polymer also permits the elimination of the expensive step of polymer extraction and solvent recovery from polymer production processes using liquid monomer.

The catalyst of the present invention produces a highly stereoregular polypropylene polymer with isotactic index generally greater than 90, preferably 93 or higher, and of low catalyst residue, total ash less than about 700 ppm and magnesium content less than about 20 ppm. Further, the polymer size distribution is such that generally less than about 5% of the produced polypropylene passes through a 140 mesh screen. These characteristics of the produced polymer permit the industrial use of the polymer without the expensive steps of polymer extraction and polymer deashing, resulting in significant cost savings.

Hydrogen is often used to control the molecular weight of polymers. In the method of making polypropylene, the present catalyst component produces a polymer having a desirable molecular weight distribution at lower hydrogen pressures than generally used in other manufacturing processes.

EXAMPLES

The following examples illustrating certain embodiments of the present invention are intended only to illustrate the invention and are not to be construed in any limiting sense. The polymer size distributions for polypropylene produced with the following catalysts are shown in Table I.

EXAMPLE 1

Anhydrous $MgCl_2$ was prepared by drying at 350° C. for 4 hours under an HCl blanket. 25 grams of this anhydrous $MgCl_2$, 4.34 grams $AlCl_3$ and 7.01 grams anisole were charged under a nitrogen atmosphere into a vibrating ball mill having a 0.6 liter capacity containing 316 stainless steel balls weighing a total of 3250 grams and having a diameter of 12 mm. This mixture was co-comminuted for 24 hours without temperature control. Titanium tetrachloride had been precomplexed with ethyl benzoate (EB) in n-heptane at about 50° C. 6.19 grams of this $TiCl_4$.EB complex was then charged into the vibrating ball mill after the prior 24 hour co-comminution of the other materials, and the resulting mixture co-comminuted for an additional 20 hours at ambient temperature and under an inert atmosphere. This produced a solid catalyst component which could be used, without requiring extraction or catalyst washing.

A sample of the solid catalyst so prepared was tested in the liquid propylene polymerization test. 229 milligrams of the triethyl aluminum (TEAL) co-catalyst, 120 milligrams of methyl p-toluate (MPT) and 20 milligrams of the catalyst component were charged into a 1.0 liter stainless steel autoclave equipped with an agitator. Alternatively, dilute solutions of TEAL and MPT may be pre-complexed at temperatures below about 25°

C. for from about 5 minutes to about 10 minutes before addition of the catalyst. The TEAL/Ti ratio was 240/1 and the TEAL/MPT ratio was 2.5. 300 grams of liquid propylene was then charged into the reactor. Polymerization was accomplished at about 70° C. for about 1 hour. At the end of this time any unreacted propylene was flashed off and the polypropylene produced was recovered.

156 grams of polypropylene was produced, giving a yield of 7800 grams polypropylene per gram of catalyst or 390,000 grams polypropylene per gram of titanium.

To determine the isotactic index a fraction of the polymer was extracted with boiling n-heptane for 16 hours in a Soxhlet Extractor and the n-heptane insoluble fraction dried. The isotactic index of this polymer was 86.0.

EXAMPLE 2

A catalyst, prepared according to the procedure of Example 1, was tested in the liquid propylene polymerization test as described in Example 1 with a variation in the amount of methyl p-toluate employed. In this test only 100 milligrams MPT were used, giving a TEAL/MPT ratio of 3.0. The productivity was 10,250 grams polypropylene per gram of catalyst or 512,500 grams polypropylene per gram of titanium. However, the isotactic index was only 69.0.

EXAMPLE 3

A catalyst, prepared according to the procedure of Example 1, was tested in the liquid polymerization test as described in Example 1 except that 90 milligrams of ethyl anisate were substituted for the methyl p-toluate in the liquid propylene polymerization. The TEAL/EA ratio was 4.0. The productivity of the catalyst under these conditions was only 3750 grams polypropylene per gram of catalyst or 187,500 grams polypropylene per gram of titanium with an isotactic index of 89.0.

EXAMPLE 4

A catalyst was prepared and tested using the same procedures as disclosed in Example 1 except that 5.32 grams of anisole and 4.59 grams of the $TiC_4.EB$ complex were used. The catalyst was tested according to the method of Example 1 and showed a productivity of 5250 grams polypropylene per gram of catalyst (262,500 grams polypropylene per gram of titanium) and an isotactic index of 81.3.

EXAMPLE 5

A catalyst was prepared and tested using the same procedures as disclosed in Example 1, except that 20.0 grams $MgCl_2$, 3.50 grams $AlCl_3$, 2.84 grams anisole and 4.36 grams $TiCl_4.EB$ complex were used. The catalyst exhibited a productivity of 4400 grams polypropylene per gram of catalyst (220,000 grams polypropylene per gram of titanium) and an isotactic index of 83.2.

TABLE I

| Polymer Size Distribution (Percent polymer on mesh screen) | | | | | | | |
|---|---|---|---|---|---|---|---|
| | Mesh | | | | | | |
| Example | 20 | 40 | 80 | 140 | 200 | 325 | Pan |
| 4 | 54 | 25 | 17 | 3 | 0 | 0 | 0 |
| 5 | 45 | 32 | 20 | 3 | 0 | 0 | 0 |
| 6 | 51 | 20 | 14 | 7 | 5 | 3 | 1 |
| 8 | 51 | 27 | 17 | 4 | 1 | 0 | 0 |
| 9 | 40 | 27 | 24 | 7 | 2 | 0 | 0 |
| 12 | 32 | 29 | 26 | 9 | 3 | 1 | 1 |
| 13 | 43 | 29 | 22 | 5 | 1 | 0 | 0 |

TABLE I-continued

| Polymer Size Distribution (Percent polymer on mesh screen) | | | | | | | |
|---|---|---|---|---|---|---|---|
| | Mesh | | | | | | |
| Example | 20 | 40 | 80 | 140 | 200 | 325 | Pan |
| 14 | 45 | 33 | 19 | 3 | 1 | 0 | 0 |
| 16 | 23 | 25 | 28 | 13 | 7 | 4 | 1 |
| 17 | 40 | 26 | 23 | 8 | 2 | 1 | 0 |
| 19 | 38 | 26 | 22 | 9 | 3 | 1 | 1 |
| 20 | 41 | 25 | 23 | 1 | 3 | 1 | 0 |
| 21 | 31 | 26 | 26 | 12 | 4 | 1 | 0 |
| 22 | 37 | 27 | 25 | 8 | 2 | 1 | 0 |
| 23 | 37 | 28 | 25 | 7 | 2 | 1 | 0 |
| 24 | 43 | 25 | 21 | 8 | 2 | 1 | 1 |
| 25 | 38 | 30 | 24 | 5 | 2 | 1 | 1 |
| 26 | 42 | 26 | 19 | 7 | 4 | 2 | 1 |
| 28 | 50 | 27 | 18 | 5 | 2 | 1 | 0 |
| 29 | 51 | 24 | 14 | 5 | 3 | 2 | 1 |
| 31 | 63 | 20 | 13 | 3 | 1 | 0 | 0 |
| 32 | 78 | 15 | 6 | 1 | 0 | 0 | 1 |
| 38 (7 hr) | 44 | 18 | 21 | 9 | 5 | 3 | 2 |
| 38 (10 hr) | 59 | 22 | 15 | 3 | 1 | 1 | 0 |

EXAMPLE 6

A catalyst was prepared and tested using the same procedures as disclosed in Example 1, except that 30.0 grams $MgCl_2$, 3.00 grams $AlCl_3$, 4.87 grams anisole and 6.26 grams $TiCl_4.EB$ complex were used. The catalyst exhibited a productivity of 3900 grams polypropylene per gram of catalyst (195,000 grams polypropylene per gram of titanium) and an isotactic index of 90.2.

EXAMPLE 7

A catalyst was prepared and tested using the same procedures as disclosed in Example 1, except that 20.0 grams $MgCl_2$, 1.17 grams $AlCl_3$, 2.84 grams anisole and 4.05 grams $TiCl_4.EB$ complex were used. The catalyst exhibited a productivity of 2800 grams polypropylene per gram of catalyst (140,000 grams polypropylene per gram of titanium) and an isotactic index of 85.6.

EXAMPLE 8

A catalyst was prepared by a procedure similar to that disclosed by Example 1 and tested by the procedure disclosed by Example 2. 30 grams $MgCl_2$, 5.25 grams $AlCl_3$ and 3.53 grams anisole were co-comminuted for 10 hours. 6.41 grams $TiCl_4.EB$ complex were added and co-comminution continued for 20 hours. The yield was 3900 grams polypropylene per gram of catalyst (195,000 grams polypropylene per gram of titanium) with an isotactic index of 92.4.

EXAMPLE 9

A catalyst was prepared and tested as in Example 8 except that the anhydrous $MgCl_2$ was not HCl dried and the initial milling time was 15 hours. The yield was 4800 grams polypropylene per gram of catalyst (240,000 grams polypropylene per gram of titanium) with an isotactic index of 91.9.

EXAMPLE 10

A catalyst was prepared and tested as in Example 9 except that 3.50 grams $AlCl_3$, 8.37 grams anisole, and 7.00 grams $TiCl_4.EB$ were used. The yield was only 1100 grams polypropylene per gram of catalyst (55,000 grams polypropylene per gram of titanium) with an isotactic index of 92.0.

EXAMPLE 11

A catalyst was prepared and tested as in Example 9 except that the mill was heated to about 90° C. before the addition of the $TiCl_4.EB$ complex. The yield was 4250 grams polypropylene per gram of catalyst (212,500 grams polypropylene per gram of titanium) with an isotactic index of 88.5.

EXAMPLE 12

A catalyst was prepared and tested as in Example 9 except that the final milling time was also 15 hours. The yield was 4900 grams polypropylene per gram of catalyst (245,000 grams polypropylene per gram of titanium) with an isotactic index of 92.8.

EXAMPLE 13

A catalyst was prepared and tested as in Example 12 except that 7.05 grams anisole and 7.00 grams $TiCl_4.EB$ complex were used. The yield was 4000 grams polypropylene per gram of catalyst (200,000 grams polypropylene per gram of titanium) with an isotactic index of 93.4.

EXAMPLE 14

A catalyst was prepared and tested by a procedure similar to that disclosed in Example 9 except that the final milling time was also 10 hours. 28.7 grams anhydrous $MgCl_2$, 6.52 grams $AlCl_3$, 5.28 grams anisole and 6.70 grams $TiCl_4.EB$ complex were used. The yield was 3450 grams polypropylene per gram of catalyst (172,500 grams polypropylene per gram of titanium) with an isotactic index of 94.0.

EXAMPLE 15

A catalyst was prepared and tested as in Example 14 except that 22.0 grams $MgCl_2$, 7.89 grams $AlCl_3$, 3.53 grams anisole and 5.55 grams $TiCl_4.EB$ complex were used and the mill was heated to about 90° C. before addition of the $TiCl_4.EB$. The yield was 2000 grams polypropylene per gram of catalyst (100,000 grams polypropylene per gram of titanium) with an isotactic index of 87.7.

EXAMPLE 16

Anisole and $AlCl_3$ s were pre-complexed and 6.34 grams of this complex co-comminuted with 20.0 grams anhydrous $MgCl_2$ for 24 hours in the mill of Example 1. 4.36 grams $TiCl_4.EB$ complex were added to the mill and co-comminuted for an additional 20 hours. The catalyst, when tested as in Example 1, showed a yield of 2319 grams polypropylene per gram of catalyst (115,950 grams polypropylene per gram of titanium) with an isotactic index of 92.6.

EXAMPLE 17

30.0 grams anhydrous $MgCl_2$, 5.25 grams $AlCl_3$ and 3.53 grams anisole were co-comminuted for 15 hours as in Example 1. 3.19 grams ethyl benzoate were added to the mill and the resulting mixture co-comminuted for an additional 10 hours. Finally, 4.00 grams $TiCl_4$ were added to the mill and co-comminution resumed for an additional 15 hours. The catalyst, tested as in Example 2, showed a yield of 3800 grams polypropylene per gram of catalyst (190,000 grams polypropylene per gram of titanium) with an isotactic index of 92.7.

EXAMPLE 18

A catalyst was prepared and tested as in Example 17 except that the final milling time was only 10 hours. The yield was 2050 grams polypropylene per gram of catalyst (102,500 grams polypropylene per gram of titanium) with an isotactic index of 92.7.

EXAMPLE 19

A catalyst was prepared and tested as in Example 17 except that 5.17 grams of ethyl benzoate were added to and co-comminuted with the enhanced support for only 5 hours, followed by addition of 3.78 grams $TiCl_4$ and co-comminution for 15 hours. The yield was 5500 grams polypropylene per gram of catalyst (275,000 grams polypropylene per gram of titanium) with an isotactic index of 92.4.

EXAMPLE 20

A catalyst was prepared and tested as in Example 19 except that the mill was heated to about 90° C. after the addition of $TiCl_4$. The yield was reduced to 3500 grams polypropylene per gram of catalyst (75,000 grams polypropylene per gram of titanium) with an isotactic index of 92.7.

EXAMPLE 21

A catalyst was prepared and tested as in Example 19 except that the co-comminution time after addition of ethyl benzoate was only 4 hours and the co-comminution time after addition of $TiCl_4$ was increased to 16 hours. The yield was only 3700 grams polypropylene per gram of catalyst (185,000 grams polypropylene per gram of titanium) with an isotactic index of 93.2.

EXAMPLE 22

A catalyst was prepared and tested as in Example 21 except that 5.89 grams ethyl benzoate and 3.83 grams $TiCl_4$ were used. The yield was 3750 grams polypropylene per gram of catalyst (187,500 grams polypropylene per gram of titanium) with an isotactic index of 94.5.

EXAMPLE 23

A catalyst was prepared and tested as in Example 19 except that the milling time after addition of ethyl benzoate was only 2 hours and the mill was heated to about 90° C. prior to addition of the ethyl benzoate. The yield was 3400 grams polypropylene per gram of catalyst (170,000 grams polypropylene per gram of titanium) with an isotactic index of 94.3.

EXAMPLE 24

A catalyst was prepared and tested as in Example 17 except that 4.58 grams anisole were used, 5.89 grams ethyl benzoate were used and co-comminuted for only 2 hours and finally 3.94 grams $TiCl_4$ were added and co-comminuted for 16 hours. The yield was 4100 grams polypropylene per gram of catalyst (205,000 grams polypropylene per gram of titanium) with an isotactic index of 93.7.

EXAMPLE 25

30.0 grams anhydrous $MgCl_2$ and 5.25 grams $AlCl_3$ were co-comminuted for 16 hours as in Example 1. 5.89 grams ethyl benzoate were added to the mill and the resulting mixture co-comminuted for an additional 4 hours. Finally, 3.50 grams $TiCl_4$ were added to the mill and co-comminuted for an additional 15 hours. The catalyst, tested as in Example 2, showed a yield of only 1750 grams polypropylene per gram of catalyst (87,500 grams polypropylene per gram of titanium) with an isotactic index of 88.4.

EXAMPLE 26

30.0 grams anhydrous $MgCl_2$ and 3.00 grams anisole were co-comminuted for 4 hours as in Example 1. 5.18 grams ethyl benzoate were added to the mill and the resulting mixture co-comminuted for an additional 15 hours. Finally, 3.30 grams $TiCl_4$ were added to the mill and co-comminution resumed for an additional 15 hours. The catalyst, tested as in Example 2, showed a yield of 4100 grams polypropylene per gram of catalyst (205,000 grams polypropylene per gram of titanium) with an isotactic index of 91.2.

EXAMPLE 27

30.0 grams anhydrous $MgCl_2$ was directly co-comminuted with 5.18 grams ethyl benzoate for 15 hours as in Example 1. 3.09 grams $TiCl_4$ was added to the mill and the resulting mixture co-comminuted for an additional 15 hours. The catalyst, when tested as in Example 2, showed a yield of only 3000 grams polypropylene per gram of catalyst (150,000 grams polypropylene per gram of titanium) with an isotactic index of 90.6.

EXAMPLE 28

30.0 grams anhydrous $MgCl_2$ containing 6.63% $H_2O$ were co-comminuted under a nitrogen atmosphere with 7.01 grams $SiCl_4$ for 16 hours in the mill of Example 1. 5.25 grams $AlCl_3$ and 3.53 grams anisole were added to the mill and co-comminuted for an additional 15 hours. 5.17 grams ethyl benzoate were added and co-comminuted for an additional 5 hours. Finally, 4.45 grams $TiCl_4$ were added and co-comminuted for an additional 15 hours. The catalyst, tested as in Example 2, showed a yield of only 3600 grams polypropylene per gram of catalyst (180,000 grams polypropylene per gram of titanium) with an isotactic index of 91.1.

EXAMPLE 29

A catalyst was prepared and tested as in Example 28 except that the initial milling time was only 15 hours and the milling time following addition of ethyl benzoate was only 3 hours. The yield was reduced to 1850 grams polypropylene per gram of catalyst (92,500 grams polypropylene per gram of titanium) with an isotactic index of 90.5.

EXAMPLE 30

A catalyst was prepared and tested as in Example 28 except that 14.03 grams $SiCl_4$ was used and the milling times were respectively, 18 hours, 17 hours, 2 hours and 15 hours. The yield was only 2250 grams polypropylene per gram of catalyst (112,500 grams polypropylene per gram of titanium) with an isotactic index of 90.8.

EXAMPLE 31

A catalyst was prepared and tested as in Example 28 except that the $MgCl_2$ had only a 0.35% $H_2O$ content, only 1.00 grams $SiCl_4$ were used, 3.87 grams $TiCl_4$ were used and the milling times were respective, 4 hours, 15 hours, 3 hours and 15 hours. The yield was 5900 grams polypropylene per gram of catalyst (295,000 grams polypropylene per gram of titanium) with an isotactic index of 94.5. Liquid pool polymerization tests using this catalyst under different hydrogen pressures to determine the effect of hydrogen pressure or productivity, isotactic index and melt flow were also conducted. The results of these tests are shown in Table II.

EXAMPLE 32

Anhydrous $MgCl_2$ was prepared by drying at 350° C. for 4 hours under an HCl blanket. 2500 grams of this anhydrous $MgCl_2$ and 438 grams $AlCl_3$ were charged under a nitrogen atmosphere into a Vibratom mill having a capacity of 10.0 liters and containing 2,250 stainless steel balls weighing a total of 144 kilograms and each having a diameter of one inch. This mixture was co-comminuted for 16 hours at 35°–70° C. 294 grams anisole was added and co-comminution continued for 3 hours at 35° C. 493 grams ethyl benzoate were added and co-comminuted for an additional 3 hours at 35° C. Finally, 320 grams $TiCl_4$ were added and co-comminuted for 16 hours at 62° C.

The catalyst, tested as in Example 2, showed a yield of 8000 grams polypropylene per gram of catalyst (400,000 grams polypropylene per gram of titanium) with an isotactic index of 95.6. Additional tests under a hydrogen atmosphere to determine the effect of hydrogen pressure on productivity, isotactic index and melt flow are shown in Table II. Polymer residues for several inorganics are shown in Table III.

TABLE II

Effect of Hydrogen Pressure During Polymerization

|  | Hydrogen (psig) | Liquid Pool Productivity (g PP/g Cat.) | Isotactic Index (%) | Melt Flow (dg/M) |
|---|---|---|---|---|
| Example 31 | 0 | 6000 | 94.5 | 0.4 |
|  | 5 | 7500 | 93.4 | 0.7 |
|  | 10 | 7250 | 92.7 | 1.8 |
|  | 15 | 7200 | 92.4 | 4.2 |
|  | 20 | 5500 | 92.3 | 4.0 |
|  | 25 | 5900 | 91.0 | 10.4 |
|  | 35 | 6200 | 90.5 | 26.6 |
| Example 32 | 0 | 8000 | 95.6 | 0.18 |
|  | 5 | 8900 | 93.9 | 1.25 |
|  | 10 | 7900 | 93.3 | 3.68 |
|  | 15 | 8300 | 92.2 | 3.81 |
|  | 25 | 8650 | 92.0 | 14.58 |
|  | 35 | 9800 | 89.0 | 30.92 |

TABLE III

Polymer Residue for Example 32

| Liquid Pool Productivity (g PP/g Cat.) | Total Ash (ppm) | Mg (ppm) | Ti (ppm) | Al (ppm) |
|---|---|---|---|---|
| 8900 | 590 | 18 | 3 | 220 |
| 8300 | 642 | 15 | 2 | 310 |
| 8650 | 465 | 15 | 3 | 245 |
| 9800 | 630 | 15 | 3 | 325 |

Catalyst components prepared according to the method of Example 32 have been analyzed for specific surface area by the B.E.T. method. The specific surface area is low, less than one square meter per gram. Representative specific surface areas of catalyst components prepared according to the method of Example 32 are 0.64, 0.80 and 0.94 $m^2/g$.

These areas were determined using nitrogen. Other catalyst components prepared in the same way were analyzed for specific surface area using respectively nitrogen and krypton. Specific surface areas determined with nitrogen were 0.55, 0.85, 0.62 and 0.79 $m^2/g$; those determined with krypton were 0.25, 0.40, 0.28 and 0.26 $m^2/g$.

In a further example, specific surface areas were determined at various steps in the preparation of a catalyst component according to the procedure of Example 32. The specific surface area after the co-comminution of magnesium dichloride and aluminum trichloride was 4–6 m$^2$/g. After co-comminution with anisole, the specific surface area was reduced and measured 1.25 and 1.65 m$^2$/g. After further co-comminution with ethyl benzoate, the specific surface area was further reduced and measured 0.62 and 0.72 m$^2$/g. Finally, after co-comminution with titanium tetrachloride, the specific surface area was measured as 0.76 m$^2$/g.

EXAMPLE 33

A sample of the solid catalyst component prepared according to the procedure of Example 32, was tested in the high pressure heptane polymerization test. 500 milliliters of heptane was charged into a 1.0 liter stainless steel autoclave equipped with an agitator. 290 milligrams of triethyl aluminum (TEAL) was introduced and after stirring at 20° C. for 3 minutes, 120 milligrams of methyl-p-toluate (MPT) was introduced and stirred therewith at 20° C. for 3 minutes. 20 milligrams of the catalyst component prepared according to the procedure of Example 32 was then added. 81 milliliters of hydrogen at STP and propylene (150 psig) were then added and the temperature raised to 70° C. Polymerization was accomplished at 70° C. for about 2 hours. At the end of this time the unreacted propylene was vented and the polypropylene produced was recovered by filtration. The amount of polymer soluble in the polymerization solvent was determined by evaporation of an aliquot of the solvent. The catalyst produced 7155 grams polypropylene per gram of catalyst (357,750 grams polypropylene per gram of titanium) with an isotactic index of 93.8 and a heptane soluble of 2.7%.

In a second test, 162 milliliters of hydrogen at STP was used. The catalyst produced 6075 grams polypropylene per gram of catalyst (303,750 grams polypropylene per gram of titanium) with an isotactic index of 90.0 and a heptane insoluble of 4.4%.

EXAMPLE 34

A catalyst was prepared as in Example 32 but using commercially available anhydrous magnesium dichloride. The amounts of AlCl$_3$, anisole and ethyl benzoate were also varied. 2,500 grams commercially available anhydrous MgCl$_2$ and 656 grams AlCl$_3$ were co-comminuted for 16 hours at 30° C. 443 grams anisole were added and co-comminution continued for 3 hours at 30° C. 739 grams ethyl benzoate were added and co-comminution continued for an additional 3 hours at 30° C. Finally, 319 grams TiCl$_4$ were added and the mixture co-comminuted for 16 hours at 60° C.

The catalyst, tested as in Example 32 but using 88 milligrams MPT and 10 psi hydrogen, showed a high yield of 11,300 grams polypropylene per gram of catalyst (642,000 grams polypropylene per gram of titanium) with an isotactic index of 92.7. The polymer residuals were 13 ppm magnesium, 2 ppm titanium, 227 ppm aluminum and 586 ppm total ash.

EXAMPLE 35

A catalyst was prepared and tested as in Example 32. 2500 grams MgCl$_2$ having a water content of 1.17%, 275 grams SiCl$_4$ and 656 grams AlCl$_3$ were charged into the mill and co-comminuted for 16 hours at 40° C. 393 grams anisole were added and co-comminution continued for 3 hours at 45° C. 494 grams ethyl benzoate were added and co-comminution continued for an additional 3 hours at 48° C. Finally, 321 grams TiCl$_4$ were added and the mixture co-comminuted for 16 hours at 58° C. When tested under 15 psig H$_2$ this catalyst produced 8000 grams polypropylene per gram of catalyst (400,000 grams polypropylene per gram of titanium) with an isotactic index of 89.9.

EXAMPLE 36

2660 grams of MgCl$_2$ containing 4.98% water and 1036 grams SiCl$_4$ were charged under a nitrogen atmosphere into the Vibratom mill of Example 32. This mixture was co-comminuted for 21.5 hours at 35° C. 466 grams AlCl$_3$ was added to the mill and contents and co-comminuted for 1.0 hour at 35° C. 313 grams anisole was added and co-comminution continued for 19.5 hours at 35° C. 525 grams ethyl benzoate was added and the mixture co-comminuted for 5.0 hours at 35° C. Finally, 341 grams TiCl$_4$ was added and co-comminuted at 35° C. for 19.0 hours. A sample was taken and the mixture co-comminuted an additional 6.0 hours.

The catalyst of the first sampling, tested as in Example 2, showed a yield of 3650 grams polypropylene per gram of catalyst (182,500 grams polypropylene per gram of titanium) with an isotactic index of 93.4. The catalyst of the second sampling showed a yield of only 2550 grams polypropylene per gram of catalyst (127,500 grams polypropylene per gram of titanium) with an isotactic index of 94.2.

EXAMPLE 37

A catalyst was prepared and tested as in Example 35, except that the MgCl$_2$ contained only 1.17% water and only 185 grams SiCl$_4$ were used. 369 grams AlCl$_3$, 249 grams anisole, 416 grams ethyl benzoate and 271 grams TiCl$_4$ were substituted for the quantities of Example 35.

The polymerization results were identical to those of Example 36.

EXAMPLE 38

5000 grams of MgCl$_2$ containing 1.17% water and 552 grams SiCl$_4$ were charged under a nitrogen atmosphere into the Vibratom mill of Example 32. This mixture was co-comminuted for 16.0 hours at 28°–55° C. 875 grams AlCl$_3$ was added to the mill and contents and co-comminuted for 1.0 hour at 28°–55° C. 588 grams anisole was added and co-comminution continued for 3.0 hours at 53°–63° C. 986 grams ethyl benzoate was added and the mixture co-comminuted for 3.0 hours at 53°–63° C. 640 grams TiCl$_4$ was added and co-comminuted at 63° C. for an additional 7.0 hours, 3.0 hours, 4.0 hours and finally 3.0 hours, with a sample of catalyst component taken for testing after each time.

The catalyst was tested as in Example 2, except that 25 psig hydrogen was present in the autoclave. The productivity and isotactic index are shown in Table IV.

TABLE IV

| | Liquid Pool Polymerization | | |
| --- | --- | --- | --- |
| | | Productivity | |
| | TiCl$_4$ milling time (hrs) | (g. PP/g Cat.) | (g. PP/g Ti) | II (%) |
| Example 38 | 7.0 (25 psig H) | 4800 | 240,000 | 90.0 |
| | 10.0 | 5850 | 292,500 | 91.1 |
| | 14.0 | 5800 | 290,000 | 90.2 |

TABLE IV-continued

| | | Liquid Pool Polymerization | | |
| --- | --- | --- | --- | --- |
| | | | Productivity | |
| | TiCl$_4$ milling time (hrs) | (g. PP/g Cat.) | (g. PP/g Ti) | II (%) |
| Example 39 | 17.0 | 5750 | 287,500 | 91.0 |
| | 17.0 (no H$_2$) | 4750 | 237,500 | 95.6 |
| | 7.0 | 2500 | 125,000 | 96.3 |
| | 10.0 | 3600 | 180,000 | 95.6 |
| | 13.0 | 4250 | 212,500 | 94.1 |
| | 18.0 | 4750 | 237,500 | 93.8 |
| | 23.0 | 3500 | 175,000 | 94.5 |

EXAMPLE 39

A catalyst was prepared and tested as in Example 35 with the quantity of materials the same as there except that only 2500 grams MgCl$_2$ were used. The milling times and temperatures were changed to 5.0 hours at 35°–70° C. for the MgCl$_2$ and SiCl$_4$, 1.0 hour at 35° C. after addition of AlCl$_3$, 3.0 hours at 35°–70°C. after addition of anisole and 3.0 hours at 35°–70° C. after addition of ethyl benzoate. Milling after addition of TiCl$_4$ was at 35°–70° C. and catalyst component samples were taken after 7.0, 10.0, 13.0, 18.0 and 23.0 hours.

Polymerization test results are shown in Table IV.

EXAMPLE 40

2500 grams MgCl$_2$ containing 0.16% water and 37 grams SiCl$_4$ were charged under a nitrogen atmosphere into the Vibratom mill of Example 32. This mixture was co-comminuted for 5.0 hours at 52° C. 438 grams AlCl$_3$ was added and co-comminuted for 1.0 hour at 60° C. 294 grams anisole was added and co-comminuted for 3.0 hours at 70° C. 494 grams ethyl benzoate was added and co-comminuted for 3.0 hours at 75° C. Finally, 323 grams TiCl$_4$ was added and co-comminuted at 92° C. for 18.0 hours and sampled, followed by an additional co-comminution at 32° C. for 1.0 hour.

The catalyst was tested as in Example 38. Productivity of the first sample was 4600 grams polypropylene per gram of catalyst (230,000 grams polypropylene per gram of titanium) with an isotactic index of 87.2. The second sample showed a productivity of 5100 grams polypropylene per gram of catalyst (255,000 grams polypropylene per gram of titanium) with an isotactic index of 93.9.

EXAMPLE 41

A sample of a solid catalyst component prepared according to the procedure of Example 32 was tested in the polymerization of ethylene. A one liter jacketed and magnetically stirred autoclave was maintained at 25° C. and under an ethylene purge. 194 milligrams of triethyl aluminum (TEAL) was introduced to the autoclave followed by 16 milligrams of the catalyst component prepared according to the procedure of Example 32. The catalyst component was introduced as a 40 milligram per milliliter dispersion in mineral oil. The autoclave was pressurized to 65 psig with hydrogen. 500 milliliters of isobutane followed by ethylene were pressurized into the reactor and the contents brought to a total pressure of 500 psig at 85° C. The polymerization was terminated after one hour, the isobutane and unreacted ethylene was vented and the polyethylene produced was recovered.

The catalyst produced 9,700 grams polyethylene per gram of catalyst (485,000 grams polyethylene per gram of titanium). The melt index of the polymer was 3.1 grams per ten minutes, the density 0.9694 grams per cc and the Mw/Mn ratio 6.2.

EXAMPL 42

The polymerization of Example 41 was repeated except that the polymerization was conducted for four hours. The catalyst produced 20,800 grams polyethylene per gram of catalyst (1,040,000 grams polyethylene per gram of titanium) during four hours. The catalyst productivity was 5,200 grams polyethylene per gram of catalyst per hour (260,000 grams polyethylene per gram of titanium per hour). The melt index of the polymer was 8.8 grams per ten minutes, the density 0.9666 grams per cc and the Mw/Mn ratio 4.9.

EXAMPLE 43

The polymerization of Example 41 was repeated except that triisobutyl aluminium (TIBAL) was used as the co-catalyst in place of triethyl aluminum, 20 milligrams of the catalyst component prepared according to the procedure of Example 32 was used and the hydrogen pressure was 50 psig.

The catalyst produced 7,300 grams polyethylene per gram of catalyst (365,000 grams polyethylene per gram of titanium). The melt index of the polymer was 0.9 grams per ten minutes, the density 0.9593 grams per cc and the Mw/Mn ratio 5.0.

EXAMPLE 44

A catalyst was prepared according to the procedure of Example 1 and tested in the bulk polymerization of 1-butene. 229 milligrams TEAL, 100 milligrams MPT and 20 milligrams of the catalyst were introduced into a one liter autoclave equipped with an agitator. The autoclave was pressurized with 10 psi hydrogen and then charged with 500 milliliters of 1-butene. Polymerization was conducted at 40° C. for 2 hours. At the end of this time unreacted 1-butene was flashed off and the polybutene produced was recovered.

The catalyst produced 64 grams polybutene, giving a yield of 3,200 grams polybutene per gram of catalyst. When extracted by boiling diethlyl ether for 16 hours in a soxhlet extractor, the ether insoluble fraction represented 94.4 percent of the polymer produced.

In view of the preceding description and examples, further modifications and alternative embodiments of the present invention should be apparent to those skilled in the art. For example, it may be preferable to slowly add the liquid reactants, such as methyl phenyl ether, ethyl benzoate, and titanium tetrachloride, in a metered spray during the initial 30–60 minutes of the respective co-comminution stages in order to avoid forming a paste-like mixture of ingredients. Accordingly, the preceding description and examples are to be construed as explanatory and illustrative only and are for the purpose of teaching and enabling those skilled in the art to practice this invention.

While the preferred embodiment is to be understood to be the best mode presently contemplated, it is by no means the only embodiment possible. It will be apparent to those skilled in the art that many modifications and changes in this specific method and composition may be made without departing from the scope and spirit of the present invention. For example, the disclosed catalyst may be suited for polymerizing olefins other than alpha-olefins. Also, supports other than magnesium chloride and active transition metal compounds other than titanium tetrachloride may become commercially feasible. It is applicant's intention in the following claims to cover such modifications and variations as fall within the true spirit and scope of the invention.

What is claimed is:

1. A process for the polymerization of olefins comprising contacting an alpha-olefin or a mixture of alpha-olefins under suitable reaction conditions with a catalyst system comprising a catalyst and a cocatalyst, wherein the cocatalyst comprises an organometallic compound and the catalyst comprises a solid resulting from the interaction of reactants consisting essentially of a support base selected from magnesium and manganese dihalides; a second solid material selected from aluminum trihalides, phosphorus trichloride, and phosphorus oxyrichloride; a first electron donor selected from ethers and non-halogenated esters of carboxylic acids; and a polymerization active tritetra-, or penta-valent transition metal compound of a Group IVB–VIB metal; said catalyst being prepared by co-comminuting said support base and said second solid material to form an anhydrous mixture, co-comminuting the anhydrous mixture with said first electron donor to form a catalyst support, and treating said catalyst support with, said transition metal compound.

2. A method according to claim 1 wherein said transition metal compound is a liquid titanium compound.

3. A method according to claim 2 wherein said titanium compound is a titanium tetrahalide.

4. A method according to claim 2 wherein said treating step is performed by co-comminuting the transition metal compound and the catalyst support.

5. A method according to claim 4 including the further step of exposing the solid, particulate catalyst support to second organic electron donor prior to, simultaneously with, or after exposure to the transition metal compound.

6. A method according to claim 5 wherein said second electron donor is selected from ethers and non-halogenated esters.

7. A method according to claim 6 wherein the first and second electron donors are different said exposure to the second electron donor is achieved by co-comminuting the catalyst support and the second electron donor prior to the contacting of the catalyst support with the transition metal compound.

8. A method according to claim 7 wherein said second electron donor is selected from aromatic esters of carboxylic acids and aromatic ethers.

9. A method according to claim 8 wherein said first electron donor is selected from aromatic esters of carboxylic acids and aromatic ethers.

10. A method according to claim 9 wherein said support base is magnesium dichloride, the second solid material is aluminum trichloride, and the transition metal compound is titanium tetrachloride.

11. A method according to claim 10 wherein the first and second electron donors are selected from ethyl benzoate and methyl phenyl ether.

12. A method according to claim 11 wherein for every 8 moles of $MgCl_2$ used there are between about 0.5 to about 3.0 moles of $AlCl_3$, between about 0.5 and about 3.0 moles of the first electron donor, between about 0.5 and about 3.0 moles of the second electron donor, and between about 0.1 and about 1.0 moles of $TiCl_4$.

13. A method according to claim 12 wherein for every 8 moles of $MgCl_2$ used there are about 1 and 1.5 moles of the first electron donor.

14. A method according to claim 13 wherein for every 8 moles of $MgCl_2$ used there are about 0.5 to 1.5 moles of the second electron donor.

15. A method according to claim 13 wherein for every 8 moles of $MgCl_2$ used there are about 0.8 to about 1.2 moles of the second electron donor.

16. A method according to claim 13 wherein for every 8 moles of $MgCl_2$ used there are about 1 to about 1.5 moles of $AlCl_3$.

17. A method according to claim 16 wherein for every 8 moles of $MgCl_2$ used there are about 0.4 to about 0.6 moles of $TiCl_4$.

18. A method according to claim 15 wherein for every 8 moles of $MgCl_2$ used there are about 1 to about 1.5 moles of $AlCl_3$.

19. A method according to claim 18 wherein for every 8 moles of $MgCl_2$ used there are about 0.4 to about 0.6 moles of $TiCl_4$.

20. A process according to claim 19 wherein said co-comminuting is conducted at a temperature in the range of about 0° C. to about 90° C.

21. A process according to claim 20 wherein said catalyst support is prepared by co-comminuting at a temperature of about 30° C.

22. A process according to claim 17 wherein said co-comminuting is conducted at a temperature in the range of about 0° C. to about 90° C.

23. A process according to claim 22 wherein said catalyst support is prepared by co-comminuting at a temperature of about 30° C.

24. A process according to claim 15 wherein said support base is hydrated magnesium dichloride and said support base is co-comminuted with $SiCl_4$ to obtain a substantially anhydrous mixture before said magnesium dichloride is co-comminuted with $AlCl_3$.

25. A method according to claim 17 wherein said cocatalyst is an organoaluminum co-catalyst.

26. A method according to claim 25 wherein said cocatalyst further comprises an organic electron donor and said alpha olefin comprises propylene.

27. A method according to claim 26 wherein said organoaluminum co-catalyst is a trialkyl aluminum and said electron donor of said co-catalyst is an ester of a carboxylic acid.

28. A method according to claim 27 wherein said alpha olefin is propylene and said electron donor of the co-catalyst is selected from the group consisting of ethyl benzoate, methyl-p-toluate and ethyl anisate.

* * * * *

UNITED STATES PATENT AND TRADEMARK OFFICE
CERTIFICATE OF CORRECTION

PATENT NO. : 4,618,661

DATED : October 21, 1986

INVENTOR(S) : Malcolm J. Kaus and Nemesio D. Miro

It is certified that error appears in the above-identified patent and that said Letters Patent are hereby corrected as shown below:

Column 21, line 16, "oxyrichloride" delete and substitute therefor
---oxytrichloride---.

Column 21, line 18, delete "tritetra" and insert therefor
---tri-, tetra-, ---.

Column 21, line 24, delete "with," and insert therefor ---with---.

Signed and Sealed this

Twenty-fourth Day of February, 1987

*Attest:*

DONALD J. QUIGG

*Attesting Officer*      *Commissioner of Patents and Trademarks*